United States Patent
Lacaze et al.

(10) Patent No.: US 11,708,074 B2
(45) Date of Patent: Jul. 25, 2023

(54) EFFECT OF MULTIPLE RULES OF THE ROAD AT DIFFERENT ELEVATION PROFILES ON SPEED CONSTRAINTS AND FUEL CONSUMPTION

(71) Applicant: Robotic Research OpCo, LLC, Clarksburg, MD (US)

(72) Inventors: Alberto Daniel Lacaze, Potomac, MD (US); Karl Nicholas Murphy, Cocoa Beach, FL (US)

(73) Assignee: Robotic Research OpCo, LLC, Clarksburg, MD (US)

(*) Notice: Subject to any disclaimer, the term of this patent is extended or adjusted under 35 U.S.C. 154(b) by 589 days.

(21) Appl. No.: 16/791,126

(22) Filed: Feb. 14, 2020

(65) Prior Publication Data
US 2021/0253097 A1 Aug. 19, 2021

(51) Int. Cl.
*B60W 30/00* (2006.01)
*B60W 30/14* (2006.01)
(Continued)

(52) U.S. Cl.
CPC ........ *B60W 30/146* (2013.01); *B60W 30/182* (2013.01); *B60W 40/076* (2013.01); *B60W 40/105* (2013.01); *B60W 50/14* (2013.01); *G06V 20/56* (2022.01); *G08G 1/096716* (2013.01); *G08G 1/096791* (2013.01);
(Continued)

(58) Field of Classification Search
CPC ............. B60W 30/146; B60W 30/182; B60W 40/076; B60W 40/105; B60W 50/14; B60W 2510/1055; B60W 2530/10; B60W 30/165; B60W 2050/146; B60W 2552/15; B60W 2554/4029; B60W 2555/20; B60W 2555/60; B60W 2556/10; B60W 2556/45; B60W 2720/103; B60W 2720/106; B60W 2720/30; G06V 20/56; G08G 1/096716; G08G 1/096791; G08G 1/22; Y02T 10/40; Y02T 10/84
See application file for complete search history.

(56) References Cited

U.S. PATENT DOCUMENTS 10,393,195 B2 * 8/2019 Follen .................. F16D 48/06
2011/0246019 A1 * 10/2011 Mineta .............. B60W 50/0097
903/903
(Continued)

*Primary Examiner* — Truc M Do
(74) *Attorney, Agent, or Firm* — RowanTree Law Group, PLLC; Carson C. K. Fincham

(57) ABSTRACT

This invention involves the effect of multiple rules of the road at different elevation profiles on the speed constraints and therefore the overall fuel efficiency. A vehicle designed to optimize fuel consumption that is comprised of the rules of the road that determine maximum speed, minimum speed, stop signs, streetlights, and/or changes in other rules that determine the allowable speeds of the road, a localization mechanism, and an optimization engine to optimize the fuel economy by selecting a speed profile within that maintains the vehicle within the assigned range of speeds and minimizes fuel consumption. A wide variety of methods that typically are used to optimize the fuel efficiency of human drivers operating standard vehicles can also be applied towards autonomous vehicles driving at different speed constraints and with different changes in the elevation.

11 Claims, 8 Drawing Sheets

(51) Int. Cl.
*B60W 30/182* (2020.01)
*B60W 50/14* (2020.01)
*B60W 40/105* (2012.01)
*B60W 40/076* (2012.01)
*G08G 1/0967* (2006.01)
*G08G 1/00* (2006.01)
*G06V 20/56* (2022.01)

(52) U.S. Cl.
CPC ....... *G08G 1/22* (2013.01); *B60W 2510/1055* (2013.01); *B60W 2530/10* (2013.01)

(56) References Cited

U.S. PATENT DOCUMENTS

| | | | |
|---|---|---|---|
| 2012/0010767 A1* | 1/2012 | Phillips | B60W 50/0097 |
| | | | 180/65.21 |
| 2013/0297174 A1* | 11/2013 | Lacaze | B60W 30/143 |
| | | | 701/94 |
| 2014/0244150 A1* | 8/2014 | Boesch | B60R 16/0236 |
| | | | 701/123 |

* cited by examiner

EFFECT OF MULTIPLE RULES OF THE ROAD AT DIFFERENT ELEVATION PROFILES ON SPEED CONSTRAINTS AND FUEL CONSUMPTION

CROSS-REFERENCES TO OTHER APPLICATIONS

None.

STATEMENT REGARDING FEDERAL SPONSORSHIP

No part of this invention was a result of any federally sponsored research.

FIELD OF THE INVENTION

The invention pertains to the effect of the multiple rules of the road and changes in elevation on speed restraints and fuel efficiency.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND

The statements in this section merely provide background information related to the present disclosure and may not constitute prior art.

Over the years, cruise control has minimized fuel consumption inefficiencies that result from oscillations around the cruising speeds for the typical driver. However, this improvement is mostly realized in flat terrains and at ideal speeds (e.g. 55 mph highway speeds). However, experienced drivers are capable of higher fuel efficiency rates than state of the art cruise control systems. This is especially true for hilly routes. In fact, there is a large community of "hyper-milers" who compete against each other to get the best fuel economy from their vehicles. There are several reasons why this is possible:

Advanced drives use their vehicle's inertia and the corresponding kinetic and potential energy. They use kinetic energy in the body of the vehicle to aid areas where more energy is needed (e.g. hill climbing). In many cases, they may accelerate on flats before the hill to slowly accumulate the energy that will be consumed as the vehicle climbs the hill as this may be advantageous to the fuel economy of the vehicle. Likewise, they may be more likely to let the vehicle reach higher speeds at the end of a downhill (rather than breaking or using much less throttle) and "coast" on the flat after the hill is has flattened out.

Drivers tend to drive faster on downward slopes and slower on up-hills therefore reducing changes in throttle and thus reducing changes in engine power output.

As the vehicle goes uphill using a standard cruise control, the transmission sometimes downshifts to a lower gear. Even though a cruise control may provide hysteresis to reduce this effect, the standard cruise control is not aware of the elevation profile ahead and therefore cannot select the gear and throttle position for optimal fuel efficiency.

SUMMARY OF THE INVENTION

To minimize the limitations in the prior art, and to minimize other limitations that will be apparent upon reading and understanding the present specification, the present invention pertains to the effect of multiple rules of the road combined with changes in the elevation on the speed constraints and therefore the overall fuel efficiency.

A wide variety of tips of increasing the fuel efficiency that are typically applied to the case of human drivers driving vehicles can also be applied to autonomous vehicles. These tips will greatly improve the overall fuel efficiency of the autonomous vehicles.

BRIEF DESCRIPTION OF THE DRAWINGS

The present invention is described in the detailed description that follows, with reference to the following noted drawings that illustrate non-limiting examples of embodiments of the present invention, and in which like reference numerals represent similar parts throughout the drawings.

DETAILED DESCRIPTION OF THE INVENTION

Elements in the Figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Unless specifically set forth herein, the terms "a," "an," and "the" are not limite3d to one element, but instead should be read as meaning "at least one." The terminology includes the words noted above, derivatives thereof, and words of similar import.

The particulars shown herein are given as examples and are for the purposes of illustrative discussion of the embodiments of the present invention only and are presented in the cause of providing what is believed to be the most useful and readily understood description of the principles and conceptual aspects of the present invention.

Figure 1:
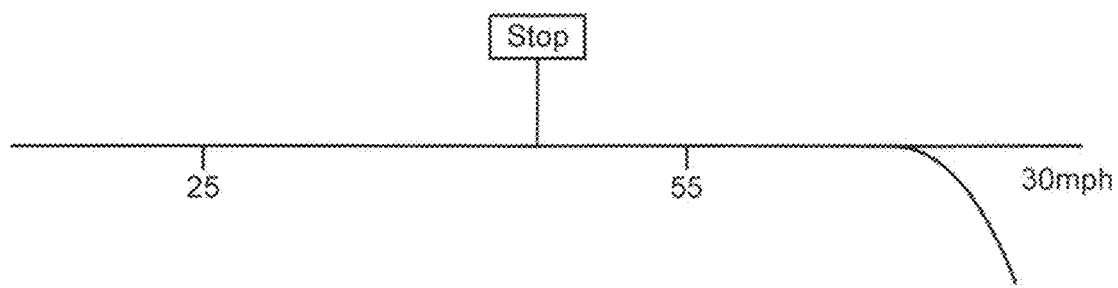
FIG. 1—Illustration of the multiple rules of the road that exist in a realistic life situation and how this can potentially have an impact on the speed restraints and the fuel efficiency FIG. 2—Typical fuel efficiency curve for level terrain.

FIG. 1 shows an example of an autonomous vehicle that needs to travel under conditions in which there are multiple rules of the road that are present. In this particular example, there is a speed limit of 25 miles that is first present and then there is a stop sign in which the autonomous vehicle needs to stop. Then the speed limit changes to 55 miles per hour which results in the autonomous vehicle accelerating to the new speed. After this, there is a turn ahead which requires the autonomous vehicle to slow down to a speed of 30 miles per hour. In addition to these types of multiple rules of the road, there can also be changes in elevation that also occur in addition to these changes in the rules of the road. In this invention, we look at the effect of the multiple rules of the road combined with the changes in the elevation on the speed restraints and the overall fuel efficiency that can be achieved with the autonomous vehicles.

The fuel efficiency as a function of speed in a particular vehicle changes depending on a variety of factors which include: RPMs, gear, aerodynamic drag, rolling resistance, and the load that the engine is being subject to. As a driver sets the speed in the cruise control, this speed will seldom be the optimal. And more importantly, there is not a single speed that will maintain the vehicle at an optimal fuel economy given a particular elevation profile. It may sound counterintuitive, but under certain conditions, faster may be more fuel efficient. This is clearly illustrated at very slow speed where the fuel efficiency increases significantly from parked (where fuel efficiency is 0).

Figure 2:
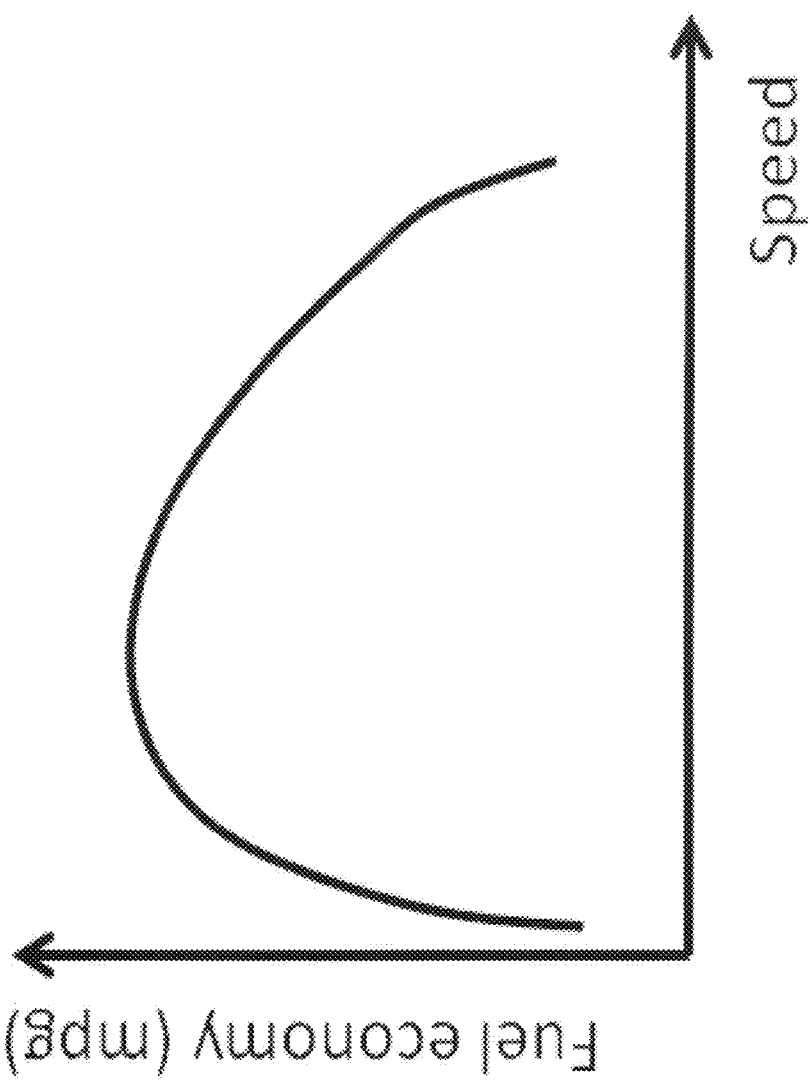

The fuel efficiency curve. There are several aspects that affect the fuel efficiency curve. FIG. 2 shows a typical fuel efficiency curve for a single gear ratio (e.g. generator). As the RPMs of the engine go to zero, the engine will lug or stall. At low RPMS the engine runs at undesirable volumetric efficiency often producing incomplete combustion and therefore lowering efficiency. As the RPMs go to the higher end of the curve, the non-linear effects of the viscous friction of liquids and gases, heat dissipation limits, and torque limits on the parts become overwhelming factors that decrease fuel efficiency. It is also known that for many engines, the load that the engine is subject to, deforms this curve and in general moves the optimal RPMs to a different speed mostly because engines would stall at lower RPMs for higher loads. This is important, because we are going to later claim that the optimal RPMs and the resulting speed can be obtained only if the engine load is known, and this load will depend on the vehicle state and the slope that the vehicle is being subject to. Electric motors also have cusps in their efficiency vs speed curves where the optimal speed is neither at the lowest or the highest rpms.

Figure 3:
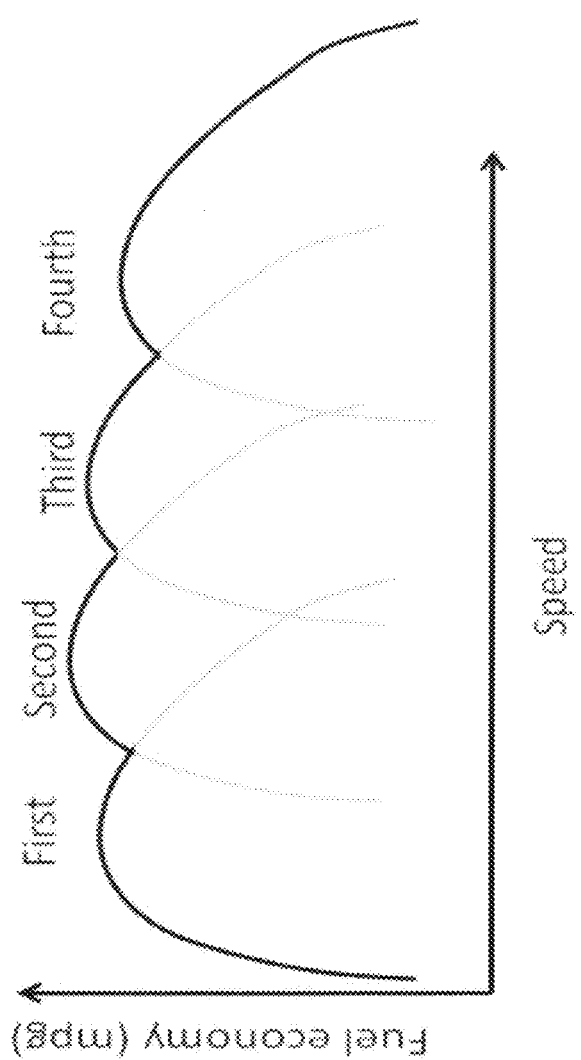
FIG. 3—Typical fuel efficiency for a four-gear transmission.

Adding a transmission with multiple gear ratios extends the range of output speeds at which the vehicle can be operated. FIG. 3 shows a typical fuel efficiency of a vehicle with a four-gear transmission. A "gear shift" is achieved by the automatic transmission to extend the speed at which the engine can provide useful torque without exceeding its maximum (and minimum) RPMs. Once again, this curve is affected by the load on the engine, and therefore, the slope that the vehicle is driving. Modern shift control systems account for the fact that the driver may be driving more aggressively or carrying extra load (i.e. towing) to change the points at which the gear happens. This often manifests as a "off road", "economy" or "towing" modalities available in higher end vehicles.

Effects of slope on a vehicle. As a vehicle climbs a slope, some energy is converted to potential energy. This energy comes from additional energy output from the motor (increase in motor load) or from a reduction of kinetic energy (reduced speed). When the vehicle descends a slope, the opposite occurs. Potential energy is reduced allowing a reduced energy output from the motor (decreased motor load) or an increase in kinetic energy (increased speed). This energy transfer is exploited to adjust motor load and optimize fuel efficiency.

Effects of the motor load. As the engine load increases, the torque output increases at constant speed. The higher the load, the higher the torque requirements and the lower the fuel efficiency will be for the same speed at a particular gear. The load depends on a variety of components including the mass of the vehicle, tire inflation, terrain type, drag, and most importantly slope of the terrain.

Terrain profile availability. With the widespread usage of GPS and navigation systems, it is now possible to obtain elevation profiles for most of the world. There are several sources for that information, some examples include: commercially available mapping products and military collected DTED data. In one incarnation of the invention, no elevation profile is necessary as the system will learn the elevation profiles of previously followed routes.

Proposed invention. The proposed invention describes a system that utilizes the energy storage provided by vehicle's mass in the form of potential and kinetic energy to optimize the fuel consumption. It also optimizes speed taking under consideration the efficiency curve of the motor/gear combination for that load. One incarnation of the system is in the form of a "cruise control" that optimizes the speed within a speed range provided by the driver given the elevation profile of all or part of the route the that vehicle will follow.

Figure 4:
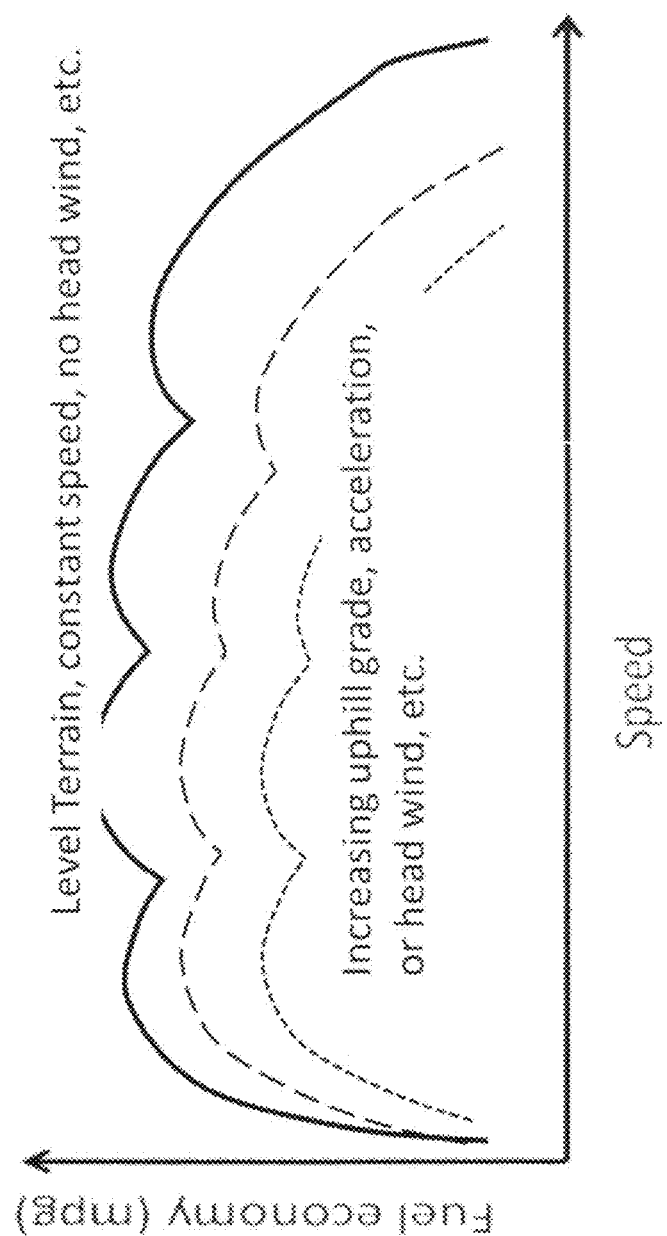
FIG. 4—This figure shows that using fuel economy data that cover the actual conditions encountered will improve the final results.

FIG. 4 shows that fuel economy does not depend solely on speed, but also depends on a multiple of other factors. Driving uphill or on rougher roads decrease fuel economy, as does increased vehicle weight and vehicle air resistance (adding a roof top carrier). Environmental conditions such as head winds, cross winds, rain, and snow, also decrease economy. Likewise, accelerating burns more fuel at a given speed, at that instant, than not accelerating. Some factors can improve fuel economy. Driving downhill, tail winds, and decelerating improve fuel economy.

Using fuel economy data that cover the actual conditions encountered will improve the final results. Some factors can be known a-priori such as road grade, weather can be forecasted, and vehicle loads can be specified by the driver. Some factors may be determined by monitoring the efficiency and constructing the fuel economy curves on the fly.

Overall System Diagram. The system will be composed of an elevation database, a localization mechanism, and a speed optimization mechanism. FIG. 3 shows the main components of the system. The optimization engine receives a desired speed range from the operator (max speed and min speed), and a route or elevation profile. Then, utilizing an elevation database, a localization mechanism and a weight estimate it optimizes the current speed to minimize fuel consumption. The route and the weight estimate may be provided or predicted by the optimization engine. For example, if the vehicle has been in a particular route for a certain amount of time it would be assumed to continue being on that route or a more sophisticated algorithm may predict a particular turn given previous routes or based on historical traffic data. The elevation database may be provided, or it may be learned from previous routes.

Optimization Engine. There is a variety of methods for optimizing the cruise control speed for the proposed system. In this section we will present a rendition to practices of such mechanism. Techniques available for optimization include: integer programming, dynamic programming, simplex related algorithms, and standard neural networks. There is also the possibility of pre-computing and storing much of the optimization results.

In our render to practice implementation we utilized a simple relatively brute force search mechanism of finding the optimal speed. Let's say that at each moment of time, the control optimization engine may change the throttle and gear setting. By discretizing time and concatenating sequences of throttle and gear commands, different control strategies are generated. We call these acceleration/deceleration sequences: acceleration profiles. The acceleration profiles are simulated on a kinematic and dynamic model of the system that takes under consideration the elevation profile, wind conditions, the weight, torque and speed limit ranges. The simulator shows that some of these profiles are predicted to exceed the assigned speed ranges, and some will not. Within the profiles that maintain the vehicle inside the speed range for the elevation profile, there will be an optimal profile from the fuel economy standpoint.

FIG. 4 shows, an elevation profile, a test acceleration profile, and finally the resulting predicted speed profile. The predicted speed profile for the test acceleration profile exceeds the limits set by the cruise control limits set by the operator and therefore it is not a possible control strategy.

Figure 5:
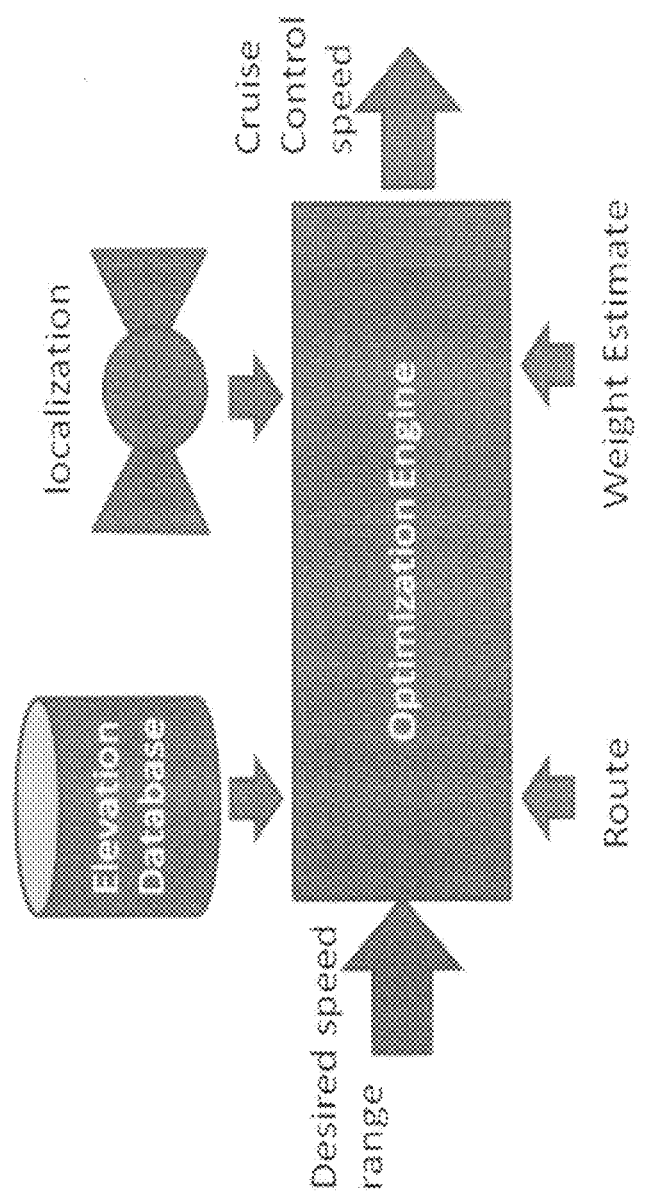
FIG. 5—Overall System Diagram

On FIG. 5, two acceleration profiles (squares and triangles) are simulated to compute fuel efficiency and fitness within the speed ranges set by the cruise control. Since both profiles meet the speed constraints, the acceleration profile with the best fuel efficiency is selected. The optimization engine generates a large number of these acceleration profiles until the best possible fuel efficiency is achieved for the time allotted for computations.

There are a variety of search techniques that will simplify the generation of these acceleration profiles to minimize the simulation sequences that must be performed. For example, the acceleration profiles can be generated in a search tree starting from the current acceleration level. Then, the simulator will only predict the speed of the vehicle for a time discrete, until the new branch of the acceleration profile is created at the next time discrete. This piece-wise search technique can prune non-conforming parts of the tree as they hit the cruise control speed limits set by the operator. Another mechanism for performing this optimization is based on a genetic algorithm where each chromosome is composed of the acceleration profile and the fitness function is based on fuel efficiency. Time horizons and control discretization can vary depending on the computational capabilities of the implementation.

Since the predicted speeds somewhat deviate from reality because of errors in the model, the cruise control system will "replan" its acceleration profiles in a control loop. The frequency of this replan mechanism depends on the computational capabilities of the system.

Convoy optimization. The military and other logistic enterprises sometimes perform convoys of vehicles for a variety of applications. When the vehicles are equipped with current cruise control systems (with a single speed setting) similar problems with fuel economy have been observed. The proposed system can be utilized to optimize the speed of the convoy given the constraints imposed by the maximum and minimum convoy separation distances. In this scenario, the acceleration profiles will not only include the accelerations for a single vehicle but the acceleration profile for all the vehicles in the convoy. As in the single vehicle case, the simulator will compute the fuel efficiency for each vehicle and the decision on what multivehicle acceleration profile is better takes under consideration the fuel consumption of the complete convoy. In the multivehicle case, multivehicle acceleration profiles may be eliminated given the separation maximum and minimum constraints as well as the individual vehicle speed constraints. With most convoys some feedback mechanism exist to execute the convoy and to maintain separation distances. In the multivehicle optimization case communication between vehicles may be necessary to correct for errors between the simulated speeds and the actual speeds.

There are a variety of vehicle simulators in the literature. The model for the simulator includes understanding of inertia, conservation of kinetic and potential energy. Moreover, in order to compute fuel economy, it will take under consideration the engine and transmission utilized, as well as the points at which the automatic transmission will do the gear shift. As expected, the simulator uses the elevation profile and predicted weight of the vehicle to do these computations. Complex simulators may perform finite element analysis of the dynamic of the vehicle including suspensions and fluids within the engine and transmission. Much simple models already provide fuel economy improvements. It is also possible to tabulate the simulation results to predict the speed and fuel economy given a sub sampling of the elevation profile. Other simulators may include neural networks or simpler Newtonian models of the vehicle.

Optimization search space. Although the above example creates an optimization engine that searches on the acceleration space, there are simple transformations that would allow the same technique to be used utilizing other equivalent control sequences. For example, an equivalent system could search in the torque domain, in the jerk domain, in the speed domain, in the position domain, and even in the RPM domain. These simple variable changes do not affect the functionality of the proposed system. For example, instead of generating an acceleration profile, an equivalent torque profile can be generated. The simulator will use the torque profile (instead of acceleration profile) to generate speeds for constraint checking and for fuel economy comparison. Similarly, another system can generate speed profiles that are then checked for fuel economy utilizing the elevation profile and the weight of the vehicle. The common elements of the proposed system include the knowledge of the elevation profile, and the range of allowable cruise control speeds.

There are many methods that can be used for optimizing the fuel efficiency in the case where human drivers operate the vehicles. Many of these fuel optimizing techniques can also be applied to autonomous vehicles.

One way of increasing the fuel efficiency is to clean the junk from the trunk. As a result, it would be a good idea not to store too many things in the trunk of the autonomous vehicle. This is because the additional weight that is carried in the vehicle takes energy to move it around. Removing this stuff improves the fuel efficiency.

Another way of increasing the fuel efficiency is to remove unused roof racks which are present in the top of the autonomous vehicle. This also applies to the case if bike racks are present. Removing these items will reduce the aerodynamic drag which results in better fuel economy.

Also, it is a good idea to check the tire inflation of autonomous vehicles on a regular basis. It is a good idea to keep the tire pressures at the manufacturer specifications. The lighter the pressure, the less rolling resistance. Also, it is worth noting that the pressure is affected by ambient temperature and as the temperature drops, so does the tire pressure, to keep track as the weather changes.

Maintain records of the fuel receipts, distance travelled and fuel economy (MPG) as part of the database in the autonomous vehicle. Monitor the effect of the use of new techniques on the overall fuel efficiency.

There should also be a fuel consumption display on the autonomous vehicles. This involves the use of instrumentation that lets you reset the readout at will so you can track individual trips, or even portions of trips you regularly travel. The venerable vacuum gauge can help you improve efficiency when driving with load/target driving.

Another fuel efficiency tip involves using the less travelled road. The lightly traveled roads results in a wider range of fuel saving techniques than if you are surrounded by other vehicles. Sometimes a somewhat longer, but lightly traveled route could result in lower overall amount of fuel that is used than the shorter, busier route.

Another useful tip for obtaining higher fuel efficiency is to leave early and not rushing. As a result, it is better for the autonomous vehicle to leave for the destination it is headed to a little early so there is no need to drive faster, brake later, or otherwise fall back into bad habits.

Headwinds are not the only winds that increase fuel consumption. Crosswinds can have a large negative effect as well. In crosswind conditions, choosing a route with a barrier such as trees or buildings along the edge will save fuel compared to a road in the open. This technique can be adopted by autonomous vehicles.

All else being equal, travelling at a constant speed on a freeway withing a flow of traffic in the same direction is more efficient than going in the same speed in isolation. This is due to aerodynamic reasons in which as flow of traffic generates a localized wind current in the direction of travel. This artificial breeze can help increase the fuel efficiency of the autonomous vehicle. This overall effect is known as the 'corridor effect'.

Another fuel efficiency tip involves make notes of the transition points in the database of the autonomous vehicles. This involves noting the points along the way where transitions occur that maximize the fuel efficiency. You can make the autonomous vehicle memorize where you can initiate a coast to just make it to the next stop sign or to note at what speed it can crest a hill so it is travelling just fast enough for the next transition after the descent.

Have your autonomous vehicles refueled during off-peak times to avoid lines and idling to wait to get to the gas tank.

It is a good idea for autonomous vehicles to avoid the use of drive-thru windows due to the excessive idling of the vehicles during the process of moving through the line.

In multi-lane traffic, choose the "lane of least resistance" to avoid unnecessary and unpredictable braking/changes in speed. For example, avoid lanes where buses are starting and stopping, or cars may be braking unpredictably to turn into driveways/parking lot entrances.

Avoid stops at the bottom of hills by avoiding roads that contain stops that bottom of hills. The reason for this is that these types of stops force you to brake and waste the kinetic energy you just gained by going downhill.

If possible, the autonomous vehicles should be taken for trips in the case where the strong tailwinds can be taken advantage of. In contrast, avoid setting the autonomous vehicles into strong headwinds/crosswinds.

Choose routes with a smooth, paved/concrete surface over gravel or rough, broken roads. This is because smoother surfaces reduces rolling resistance.

Another fuel efficiency tip is to avoid driving the autonomous vehicles in bad weather such as rain/snow/slush. One exception to this rule is when high winds (tailwinds) can be used to your advantage.

It is a good idea to have the autonomous vehicles driven when it is warm outside such as in the middle of the day rather than cold such as in the night or in the early morning. The reason for this is that cold tires and drivetrain experience more rolling and mechanical resistance, and a cold engine is less efficient.

If possible, have the autonomous vehicle go to a place of higher elevation to pick up goods so than the extra weight picked up in onboard for the descending return leg where it is less of a penalty than it would be on an ascending return leg so the items can be dropped off at the descending location.

When multiple vehicles that are ahead of you are progressing through a stop sign or a right turn at a red light, this is a mini step and crawl situation that is normally found in a bumper to bumper traffic jam. You can optimize fuel efficiency of autonomous vehicles if its approach is timed to arrive at the stop sign as the last car ahead is departing rather than using the mini step and crawl approach.

Another tip involves conserving momentum by taking a shortcut. A great way for autonomous vehicles to improve its fuel efficiency is like going through a corner parking lot, side street, or alleyways to get around having to come to a stop at an intersection or behind another vehicle. However, the autonomous vehicles need to be very careful in the parking lots since there are several risks associated with them such as pedestrians, vehicles reversing from parking spots, and other types of dangers.

In addition, the autonomous vehicles can do multiple errands at once in which the errand requiring the longest leg is done first. Then the vehicle should work its way back to the shortest distance since this process ensures that the autonomous vehicle is warmed up as much as possible before subjecting it to multiple starts and stops.

Another strategy is to minimize idling when the autonomous vehicle is stopped. In this strategy, if there is going to be idling for more than a few seconds, the gear is shifted to neutral and the engine is shut off the engine. There are two caveats for this strategy. The first caveat is that this assumes that the autonomous vehicle is in good tune-up and will re-start immediately every time. The second caveat is that if you want the autonomous vehicle to drive defensively, it might be better to leave the engine on in those circumstances for a quick rear crash avoidance maneuver.

In the absence of any other indication about how stale the light such as if there's no pedestrian signal or waiting cross traffic, the autonomous vehicle can assume that the green light that is ahead of it is about to change. As a result, the autonomous vehicle can adjust its speed accordingly based on how the traffic is to avoid full-on brake application in case the light changes.

Another strategy is avoid having very short trips with the autonomous vehicles. If there is a need to have multiple stops, then have them all done on the same trip.

The autonomous vehicle should slow down early if there is a car in front of it that can trip the sensor when approaching a red light. In this case, the autonomous vehicle may not need to come to a complete stop. This technique is nicknamed "rabbit timing".

In the case of the autonomous vehicle approaching the intersection with a green light, it can watch the pedestrian crossing light to help determine when it will turn to a yellow light.

In some conditions the use of daytime running lights or manually switching on the headlights during the day increases the safety. Also, depending on the type of autonomous vehicle, the power demands of the lighting system ranges from a few watts to well over 100 watts which is powered by gasoline. Switching the daytime running lights where the safety needs are minimal also improves the overall fuel efficiency.

The autonomous vehicle can go at the desired speed and find another vehicle that is either going the speed you want to you like large conspicuous vehicles, and drive either ahead of or behind it.

The types of sunroofs that tilt and slide to the outside on top of the roof. It is not good to leave the sunroof open at higher speeds since it can significantly increase aerodynamic drag.

There are some rare circumstances in which it is possible to effectively "draft" a larger vehicle in crosswind conditions without following directly behind it. The autonomous vehicle can take advantage of reduced drag legally and with reduced risk when the crosswind conditions cause the low-pressure area training on the lead vehicle to extend into adjacent lanes. This is an example of side-by-side driving in which the positioning is offset to the rear. The visibility directly ahead is increased, and a significant chunk of the driving picture may still be blocked depending on the size of the lead vehicle.

It is a good idea to drive the autonomous vehicles with the windows up at higher speeds to minimize aerodynamic drag. Flow-through ventilation should be used if possible.

It is also a good idea for the autonomous vehicle to drive without the use of brakes. Ss a result, the use of the brake pedal should be minimized since each time it is pressed, the gasoline is converted into brake dust and heat. This technique will reduce excessive acceleration and extend the amount of time you spend coasting down to stops and turns. In this scenario, you have to balance use of the technique against traffic conditions in order to not adversely affect other drivers.

It is also a good idea to reduce the speed to improve the fuel efficiency since the aerodynamic drag increases exponentially with speed which reduces highway cruising speed as much as practical and safe. In general, a vehicle's most efficient speed is right after its highest gear has engaged.

Once the autonomous vehicle is that once up to speed, a throttle position should be picked and held. The advantages of this technique is that it is more efficient than using the cruise control (which varies throttle position frequently and wastes fuel on hills). The disadvantages are that they are less efficient that "driving with load" (DWL)/"target driving" where the throttle is eased on inclines.

Another strategy involves the best way to use the cruise control function which should only be used on flat roads. The autonomous vehicle should use cruise control if its speed creeps higher and higher the longer it is on the road. It could be an automated cruise control function. However, it is important to realize that cruise control is less efficient than constant throttle driving and much less efficient than "driving with load"/"target driving". On hilly roads, the cruise control responds to changes in grade by feeding more throttle on the uphill and releasing on the descent which is in the exact opposite way an efficient driver would.

Here are some of the most efficient ways for an autonomous vehicle to slow down from the best to the worst. The methods include coasting in neutral, engine off in which it rolls to a stop, coasting in neutral with the engine idling, regenerative coasting which are useful in hybrid autonomous vehicles, regenerative braking which are again useful in hybrid autonomous vehicles, coasting in "deceleration fuel cut-off" mode such as in gear and above a certain engine RPM. And also, conventional friction braking which can be used for non-hybrid or hybrid autonomous vehicles.

It is also a good strategy to come to a complete stop whenever possible and also when safe and legal.

In the case of hybrid autonomous vehicles, capturing the braking energy into the battery is more efficient than braking with conventional friction brakes. This technique is not as efficient as "driving without brakes".

There are sometimes when braking hard can save fuel compared to coasting or light braking. It is a "damage control" technique when faced with an unpredictable/unanticipated stop or slow down ahead and not a lot of space. For example, approaching a fresh red traffic light that had no other indicators to predict the change (no pedestrian signal and no cars waiting on the cross street. If the autonomous vehicle brakes lightly or moderately, it will cover the entire distance to the intersection and have no option but coming to a full stop. If the autonomous vehicle brakes quite hard initially, it is possible to potentially scrub enough speed and buy enough time to coast the remaining distance to the intersection at a low speed. In this case, the autonomous vehicle arrives at a fresh green light and avoids a full stop. However, rapid deceleration is not a safe option if there is following traffic.

If the autonomous vehicle can be programmed to know how to pick the "racing line" through a corner, when safe, can help to preserve momentum. The racing line is the path through a turn with the largest possible radius. It may permit a higher speed with more comfort such as less body and g-forces and less tire scrub. This technique does not always advocate high speed turns where the cost of increased tire wear can outstrip fuel savings. This type of "racing line" can have benefits even at low speeds.

If an autonomous vehicle is travelling below the normal flow of traffic, this should facilitate drivers approaching from behind to go past safely, with a minimum of interruption. This can be done by the autonomous vehicle faking a turn by signaling and moving into a turning lane even though the intention is to continue to go straight. However, by using this technique, judgement and care is necessary so that the autonomous vehicle dos does not mislead any drivers into making an unwanted move as a result of the "miscommunication". The autonomous vehicle should be prepared to make the actual turn if the actions create a situation that makes it the safest option.

In addition, the autonomous vehicle that is travelling below the normal flow of traffic should facilitate drivers approaching them from behind to go past, rather than force them to slow down. The attention of the driver behind can be gained by moving the vehicle very obviously to the extreme right of the lane that the autonomous driver is traveling when it is safe for the following vehicle to pass. The autonomous vehicle can also signal a left or right turn to the move or the 4-way flashers could be even more effective. In addition, the autonomous vehicle can pull off the roadway completely onto the shoulder to let the following traffic go by and this is a potential option.

When facing a red traffic light, or some other predictable stop/start situation at the bottom of a hill, the autonomous vehicle is better off stopping near the top before it has accelerated to full speed. Then it should wait and time its release to make it through on the green light. Also, the potential energy can be avoided to turn into brake dust and heat.

The autonomous vehicle can participate in engine-off coasting (EOC) which is one of the largest contributors to increased efficiency of hybrid autonomous vehicles. Many of these automatically shut down the engine when the accelerator is released, and the velocity is coasting. This type of coasting can be accomplished in a non-hybrid autonomous vehicle as well as by simply shifting to neutral an switching the key from "Run" to "Acc" by being careful not to switch to "off" and cause the steering to lock. As soon as the engine stops, then the key of the autonomous vehicle should be returned to the "Run" position or there is a danger of locking out the steering and crashing. Also, it is important for the autonomous vehicle not to steer at all while the key is off to prevent a lock up. This type of techniques is best suited to autonomous vehicles that have manual steering and manual transmission. In non-hybrid, the coasting is an advanced technique and should not be attempted until the skill developed away from traffic. Also, coasting with the engine off is illegal in some areas. Also, a kill switch shuts off the engine without removing the key, thereby estimating the dangers of locking the steering wheel.

Another strategy involves "target driving" in which the technique is accomplished by choosing a "target" rate of fuel consumption and ensuring that this is not below it on hills or in very strong winds, or any conditions which cause load to vary for a given speed. In this technique, the autonomous vehicle backs off the accelerator and loses speed and downshifts as it climbs and gains that speed back on the descent. This is far more efficient than pressing the accelerator more and more to maintain speed on the way up a hill and then releasing it down the other side. It is more efficient than pressing the accelerator more and more to maintain speed on the way up a full and then releasing it down the other side. The ability of the autonomous vehicle to use this technique without adversely affecting other drivers depends on the traffic situations. The fuel economy instrumentation is required to DWL/target drive to the maximum extent, though it can also be done using a vacuum gauge, and to a much lesser extent by the seat of the pants.

When the autonomous vehicle is faced to "stop and crawl" traffic conditions, it is a good idea to leave as much space ahead of you as possible and "accordion" the space to keep the vehicle moving near a constant speed while the cars in front stop and start. In this method, some people will cut into the space that is created ahead of the autonomous vehicle. This technique can also aggravate the following drivers who can't absorb the big picture and that must be considered.

The pulse and glide or "burn and coast" technique can be used by the autonomous vehicle rather than maintaining a constant speed, where practical.

In the case where the autonomous vehicle has to move only a very short distance such as out of a garage, it is worth considering rolling it rather tan starting it up to move it.

In the case where the autonomous vehicle is starting on an incline, it is a good idea to give it a shove to get it rolling as far as possible before starting the engine.

Another strategy is to not start up the engine of the autonomous vehicle until there is an actual opportunity for it to start driving such as a gap in the traffic when exiting a driveway or parking space. Also, the key can be not turned until it is possible to time the next traffic light.

In the case where the autonomous vehicle has too much momentum after reaching the parking spot it desires, it should continue coasting further down the row or "orbiting" a spot until you can roll to a stop in position without touching the brakes. The extent of orbiting/coasting of the autonomous vehicles depends on where the engine is turned on or turned off and also whether a manual or automatic transmission is used in the autonomous vehicle. Also, it depends on the traffic on the parking lot.

In the case of on-street parking, the better spot is the one with enough room to pull in and out rather than multiple reverse/forward maneuvering such as in the case of parallel parking.

If the autonomous vehicle has no pull-through spots to choose from, then it should reverse in when arriving instead of driving in when warm and backing out/turning around when the vehicle is cold and fuel economy is at its worst. It is also worth noting that reversing into a flow of traffic is riskier and less efficient since there may not be a clear view until the autonomous vehicle's back end is out of the space.

The autonomous vehicle can also be programmed to choose a parking spot in the "periphery" of a busy lot is more efficient than navigating the rows of traffic/pedestrians to get as close as possible to the building or destination.

The autonomous vehicle should also drive through a "pull through" spot, rather than a spot that requires reverse/forward maneuvering.

If there is a convoy of autonomous vehicles, the most efficient vehicle from the convoy should accomplish the task at hand.

When the autonomous vehicle is going from reverse to a forward gear or the other way around, the engine should not be used to stop the vehicle after the gear change. Instead, the brake should be used for this.

It is possible to save a few drops of fuel by modifying the shutdown procedure of the autonomous vehicle such as when parking to turn off the key "before" shifting to Park and setting the parking brake.

When the autonomous vehicle is cruising at a constant speed, it should be shifter to the highest gear that can be used without lugging the engine of the vehicle.

When the autonomous vehicle is cruising, it should drive at the speed that allows the lowest RPM for the speed zone it is in. For example, if the posted speed limit is 30 miles per hour and the autonomous vehicle shifts into $3^{rd}$ gear at 35 miles per hour, it is possible to achieve the $3^{rd}$ gear shift, and then return and hold to 30 miles per hour without causing a downshift.

Also another strategy is to drive at the speed that allows the torque converter to lock up which is often around 40-45 miles per hour. Speeds just above this range gives the highest cruising fuel economy.

The autonomous vehicle can shift the automatic transmission to neutral when stopped in the case when the engine is kept running. Having the autonomous vehicle remain on drive wastes fuel as the engine continues to try to creep the car or forward while being held back by the brakes.

Some autonomic transmission can be coaxed to upshift sooner when accelerating by briefly releasing some of the throttle pressure and then re-applying to continue accelerating.

In the case where autonomous vehicle's transmission has an overdrive button or position, it should be left engaged to ensure the transmission will shift into its highest gear as soon as possible.

In the case where the autonomous vehicle's automatic transmission has a "power/economy" button, it should be left in the economy mode. This usually results in earlier upshifts and later downshift which overall saves the amount of fuel that is being used.

In the case of the autonomous vehicle driving through fresh snow, there is an increased rolling resistance that occurs moderately to dramatically that depends on the depth/type of snow. This results in better fuel economy until the snowplows arrive. Getting stranded in a ditch or snow drift due to the bad weather is a very bad way to waste fuel if it is necessary to idle it to stay warm while waiting for help.

When the autonomous vehicle drives in ice/snow, it should avoid wheelspin when the traction is low. Also, changing the tires in the autonomous vehicles to dedicated snow/ice tires that offer better traction can save fuel. Wheelspin is especially inefficient if the vehicle is equipped with brake assisted traction control.

In the cases where the weather has a lot of precipitation on the road such as heavy rain or snow, it is necessary to drive in the tire tracks of the vehicle in front to reduce rolling resistance. An exception to this strategy is on 'rutted' surfaces where water tends to pool on the ruts. Here driving on the ridges between the ruts will over the resistance to the autonomous vehicle.

It is a good idea to completely clear out the snow and ice off the autonomous vehicle before driving. This will minimize the use of energy hungry accessories such as defrosters and also removing an aerodynamic penalty such as increased frontal area and reduce weight such as a layer of ice and snow over an entire vehicle which can weigh a surprising amount of weight.

The use of heated parking on the autonomous vehicles will improve fuel economy. The downside of this tip is that it may increase the rate of corrosion in the case where the autonomous vehicles is driving through areas where the roads are salted.

The heater use should be avoided until the engine has reached operating temperature since engines runs rich until a minimum temperature threshold is reached. Running the heater blower be4fore that has happened will slightly increase the warm-up time and increase fuel consumption in autonomous vehicles.

Another tip involves avoiding "warm up" idling. It is not a good idea to idle the engine to warm it on a cold day. This is because an idling engine gets zero miles per gallon. It is a good idea to have the autonomous vehicles drive under light loads as soon as the engine is running smoothly which occurs immediately. This is a more efficient way to warm the engine and entire drivetrain such as the tires.

It is a good idea to cycle the A/C in the autonomous vehicles if there is a need to use it. It should be set so that the air flow recirculate4s and manually t5urn the A/C on and off as needed. For even greater efficiency, it should be programmed to switch on under the presence of light engine loads or deceleration fuel cut off and should be turned off when under moderate/heavy loads. This function should be automated in the autonomous vehicles.

Another tip involves parking the autonomous vehicle in the shade to keep the inside of the vehicle cooler which in turn can help minimize the use of air-conditioning in the autonomous vehicle.

Air conditioning should be used sparingly since it requires a lot of power which in turns uses up a lot of fuel.

In the cases where the autonomous vehicles are being driven in areas that are very hot, it is a good idea to avoid driving if possible, during the peak temperatures of the day when use of the air conditioner is "required".

It is a good idea to avoid having the autonomous vehicle driving so close behind another vehicle that it is forced to "immediately" brake if it begins slowing down. This is important at all times, but particularly in sub/urban driving where traffic changes speed more often. It is a good idea to leave enough space that there is time to choose other options such as a lane change. Also, the greater your following distance, the better your forward visibility will be, which enables the autonomous vehicle to look well ahead and anticipate changes in the driving environment.

It is a good idea to have smooth use of the accelerator, brakes, steering, and transmission to make it a little more efficient with less scrubbing of tires, energy lost through suspension movement. This is also really good for the longevity of the autonomous vehicle.

The autonomous vehicle needs to be programmed to use the horn in a defensive manner to ensure the attention of other motorists or pedestrians that are close by and in potentially risky situations. Being proactive will save fuel use and also means there is no need to brake or stop unnecessarily.

Another strategy would be for the autonomous vehicle to look well ahead and anticipate changes in the driving environment. This is a sign of efficient driving and can be done by constantly scanning well ahead in the intended path.

The autonomous vehicle should drive at the posted speed limit or the minimum allowed when it is safe to do so.

Minimize the use of low range and this will increase the engine RPM and fuel consumption for a given gear/road speed combination compared to high range.

If the autonomous vehicle uses a four-wheel drive, the there is an added friction of drive components which increases the fuel components when the center differential is locked, and the vehicle is turning. As a result, there would be a minimal use of a 4-wheel drive.

If it necessary to transport items outside the autonomous vehicle, it is a good idea to carry them on the back of the vehicle, instead of the roof. In addition, long, skinny items can even be carried underneath some vehicles that have ample ground clearance. This is more important the faster and further the autonomous vehicle intends to go.

Another tip involves minimizing the accessory loads (both mechanical and electrical) when it is safe and practical such as lights, defrost, blower, electric heated seats, and players/screens, heated mirrors, and other types of items.

Another strategy is to use a block heater. Here, engines that are the most efficient at full operating temperature, and the block heater helps it get there sooner. It typically takes about two hours of time to pre-warm a small engine.

Have the autonomous vehicle drive like one would drive a bike by doing the following: ensuring that the tires are properly inflated and the vehicle is in good mechanical condition for reduced rolling and mechanical resistance, smart braking to spend more distance coasting up to stops and don't pedal madly towards stop signs and then jam on the borders, "drive with load" on hills where it is necessary to power up hills trying to maintain the previous cruising speed, and reduce the speed between aerodynamic drag and the energy consumed to travel at high speed.

Another method involves not towing in the autonomous vehicles. The process of towing results in increased weight, higher aerodynamic drag, and a third set of tires for more rolling resistance. It is a good idea to carry loads in the vehicle if possible. If loads are not carried, the towing speeds should be minimized, and the techniques should be adjusted to account for the extra momentum the trailer and its lead adds.

Also, the autonomous vehicle should be equipped with an EZ-Pass in the case of toll roads/bridges. This is especially handy for high-speed toll passes since it avoids the slow down and acceleration back up to speed. It is generally useful anywhere and it will help the autonomous vehicle avoid the stop and go/idling in lines approaching the toll booth.

This invention describes a vehicle that is designed to optimize fuel consumption that is comprised of the rules of the road that determine maximum speed, minimum speed, stop signs, streetlights, and or other rules that determine the allowable speeds of the road, a localization mechanism, and an optimization engine to optimize the fuel economy by selecting a speed profile within that which maintains the vehicle within the assigned range of speeds and minimizes fuel consumption.

Here, the optimization engine optimizes the speed and fuel economy across multiple vehicles/convoys. And the switching times of the streetlights such as the semaphores, turning lights, pedestrian walkways, rail crossing, and other types of areas are used as part of the optimization. The optimizer uses the fact that the light turns green at a certain time and controls the speed of the vehicle in order to arrive at the intersection after a certain time and control the speed of the vehicle in order to arrive at the intersection after the light turns green or allows for traversal and therefore increase efficiency.

In the case of the presence of pedestrians in a walkway, this is used as part of the optimization. The optimizer uses the fact that the pedestrians in the walkway crosses ahead and therefore, the system controls the speed of the vehicle to arrive at the intersection after the pedestrians have cleared the walkway and therefore increases the efficiency.

Also, the presence of vehicles in a crossing road are used as part of the optimization and it will use the fact that the vehicles will cross ahead of the autonomous vehicle and therefore, the system will control the speed of the vehicle so as to arrive at the intersection after the other vehicles have cleared the walkway and therefore increase efficiency.

The timing of the lights is predicted, stored, learned, or known from other means. The vehicle either senses or is aware of the upcoming speed limits and optimizes speed to arrive to accelerate or decelerate to the desired speed by the time that it reaches the new speed zone.

The speed of other vehicles are used as part of the optimization criteria. Also, the results of the optimization are presorted in a table. Also, the elevation profile is used as part of this computation. Also, the optimizer also takes under consideration the average speed of the lanes of the roadway.

The optimizer also estimates the weight of the vehicle for better accuracy of simulation. The output of the optimization engine is not speed but acceleration or torque or fuel input into the engine. The range of speeds is assigned as a desired speed and a range of allowable deviation is provided to the optimizer.

The speeds that are closer from eh desired speed are preferred over speeds that are further away from the desired speed. A compound cost function is utilized that includes fuel efficiency and delta speed from the desired speed. The speed optimization only uses the best fuel economy based on an assumed flat terrain.

The results of the speed are recommended to the operator as opposed to that commanded to the engine. As an example, if the autonomous vehicle drives at 55 miles per hour instead of 53 miles per hour, it is possible to save 5 gallons of diesel in the next hour.

The operator receives predicted fuel expenditures at each speed range that is selected before driving starts. The allowable speed profiles are sensed from the environment by reading signs or are provided from earlier vehicles in the convoy or earlier vehicles are not related to the convoy.

The speeds and or gears are suggested in real-time to the driver as opposed to be directly controlling the engine.

The system also will warn the driver that the speed selection is a threshold away from the optimal speed for that location given the rules of the road. The shifting points on the transmission are optimized given the speed profile computed. The operator specifies on arrival time, and the system optimizes speed to arrive at the destination before the set arrival time.

FIG. 1 shows an example of a situation in which there are multiple rules of the road that exist and how this can potentially have an impact on the speed restraints and the fuel efficiency.

FIG. 2 shows a typical fuel efficiency curve that occurs in the case of having level terrain.

FIG. 3 shows typical fuel efficiency curves for a four-gear transmission engine.

FIG. 4 shows that the fuel efficiency data which cover the actual conditions encountered that improves the final results. Some examples of such conditions include increasing uphill grade, acceleration, or head wind, or other types of conditions.

FIG. 5 shows the overall system diagram which includes the optimization engine which is run at the desired speed range and also can be controlled via cruise control. The optimization engine gets information from the elevation database and localization to plan out the route and get a weight estimate.

Figure 6:
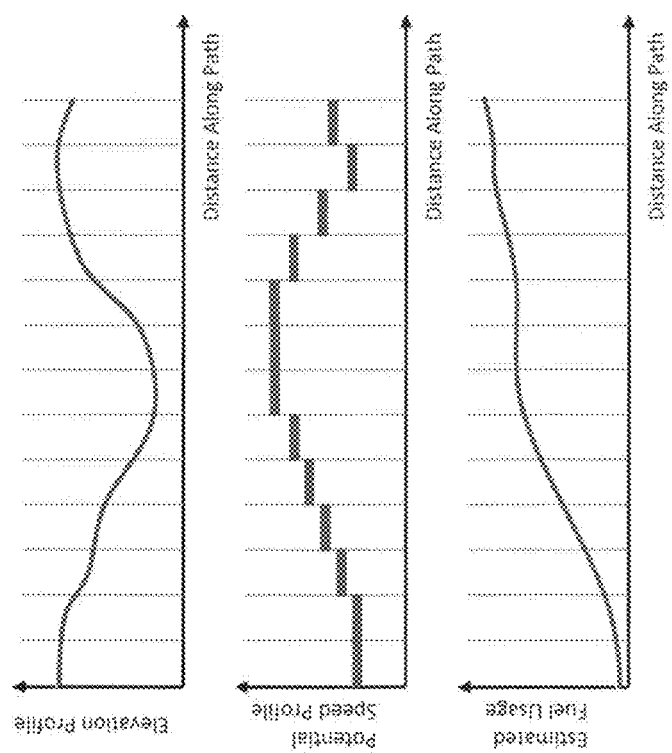
FIG. 6—Acceleration profile sequence that is eliminated because it exceeds the allowable cruise control limits.

FIG. 6 shows the acceleration profile sequence that is eliminated because it exceeds the allowable cruise control limits.

Figure 7:
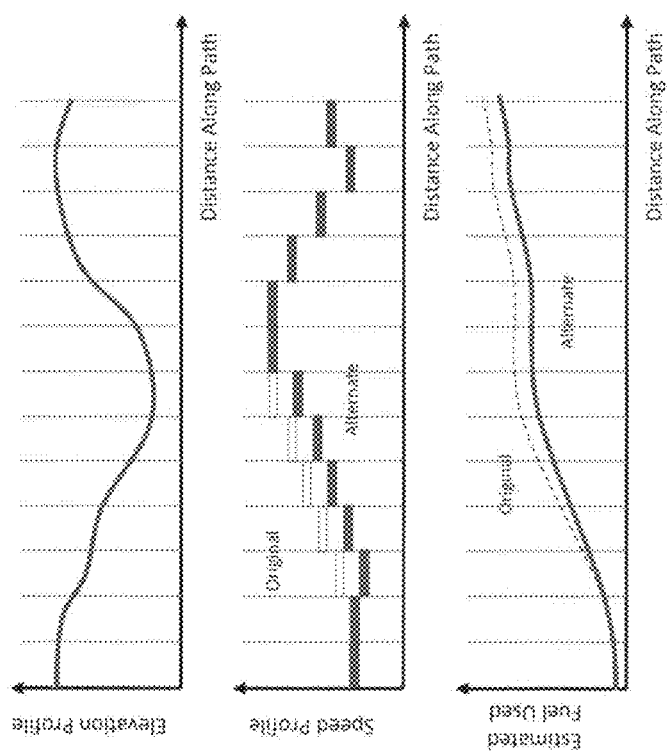
FIG. 7—Figure that shows that an alternative speed profile often results in different fuel usage and multiple profiles are searched to find the profile with the lowest fuel usage that fits the constraints.

FIG. 7 shows an alternate speed profile often results in different fuel usage. Multiple profiles are searched to find the profile with the lowest fuel usage that fits the constraints, such as speed limits and overall trip time.

Figure 8:
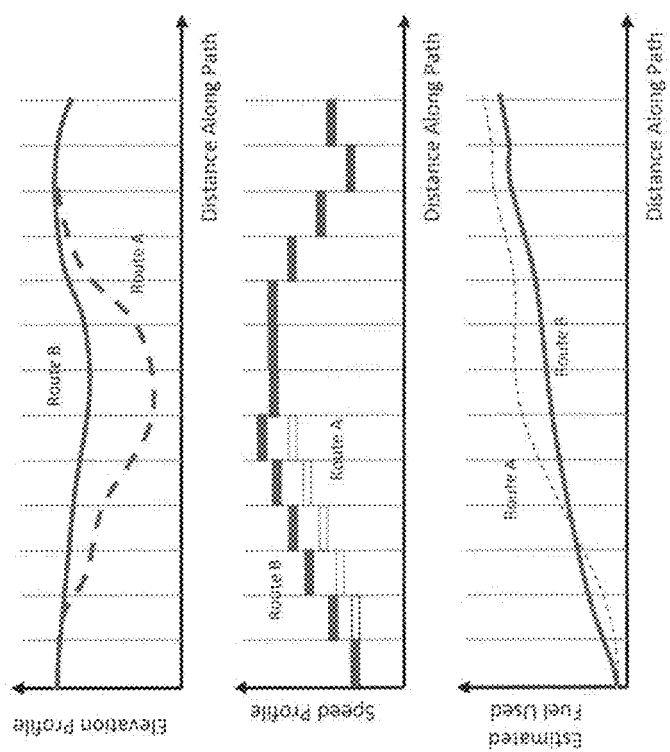
FIG. 8—Figure that shows that when available, different routes are also searched and each with their own optimal speed profile.

FIG. 8 shows that when available, different routes are also searched, each with their own optimal speed profile.

While the invention has been described in connection with what is presently considered to be the most practical and preferred embodiments, it is to be understood that the invention is not to be limited to the disclosed embodiments, but on the contrary, is intended to cover various modifications and equivalent arrangements included withing the spirit and scope of the appended claims. Note with respect to the materials of construction, it is not desired nor intended to thereby unnecessarily limit the present invention by reason of such disclosure.

The embodiments of the invention in which an exclusive property or privilege is claimed are defined as follows:

1. A vehicle designed to optimize fuel consumption, comprising:
   an optimization engine configured to optimize a fuel economy of a vehicle by selecting a speed profile within that maintains the vehicle within an assigned range of speeds and minimizes fuel consumption, the optimization engine configured to:
   a. detect a first location of the vehicle via a localization mechanism;
   b. receive a destination for the vehicle;
   c. compute a first route from the first location to a destination;
   d. compute a second route from the first location to the destination, wherein the second route differs from the first route;
   e. compute a first total fuel consumption of the vehicle on the first route;

f. compute a second total fuel consumption of the vehicle on the second route;
g. compare the first total fuel consumption and the second total fuel consumption and choose one of the first route and the second route based on the associated first and second total fuel consumption;
h. change the throttle setting to move the vehicle along the chosen first route or second route;
i. detect a second location of the vehicle via the localization mechanism;
j. compute a third route from the second location to a destination;
k. compute a fourth route from the second location to the destination, wherein the fourth route differs from the first route;
l. compute a third total fuel consumption of the vehicle on the third route;
m. compute a fourth total fuel consumption of the vehicle on the fourth route;
n. compare the third total fuel consumption and the fourth total fuel consumption and choose one of the third route and the fourth route based on the associated third and fourth total fuel consumption;
o. change the throttle setting to adjust the acceleration profile based on the chosen third route or fourth route.

2. The system of claim 1 wherein computing the first total fuel consumption comprises computing fuel consumption associated with slowing the vehicle based on the switching times of a streetlight.

3. The system of claim 2, where the timing of the lights is stored and utilized in computing the first total fuel consumption.

4. The system of claim 1 wherein the vehicle senses a change in a posted speed limit and changes the throttle setting to a required speed before the vehicle reaches the Previously Presented speed zone.

5. The system of claim 1 wherein the results of optimization are stored in an optimization table.

6. The system of claim 1 wherein a range of speeds is assigned as a desired speed based on a range of allowable deviation provided to the optimizer.

7. The system of claim 1 wherein the optimization engine displays predicted fuel expenditures along the first route and the second route before driving starts.

8. The system of claim 1 wherein the optimization engine changes a shifting points between adjacent gears of the transmission based on the speed profile computed.

9. The system of claim 1 wherein the optimization engine receives from an operator an arrival time, and the optimization engine optimizes speed to arrive at the destination before the set arrival time.

10. The vehicle of claim 1, wherein the first route and the second route follow the same path, and at least one of speed and acceleration are different.

11. A method of optimizing fuel usage of a vehicle comprising:
providing an optimization engine on a vehicle and operable to control at least one of a throttle, a steering mechanism, and a braking mechanism of the vehicle;
a. detecting a first location of the vehicle via a localization mechanism;
b. receiving a destination for the vehicle;
c. computing a first route from the first location to a destination;
d. computing a second route from the first location to the destination, wherein the second route differs from the first route;
e. computing a first total fuel consumption of the vehicle on the first route;
f. computing a second total fuel consumption of the vehicle on the second route;
g. comparing the first total fuel consumption and the second total fuel consumption and choose one of the first route and the second route based on the associated first and second total fuel consumption;
h. changing the throttle setting to move the vehicle along the chosen first route or second route;
i. detecting a second location of the vehicle via the localization mechanism;
j. computing a third route from the second location to a destination;
k. computing a fourth route from the second location to the destination, wherein the fourth route differs from the first route;
l. computing a third total fuel consumption of the vehicle on the third route;
m. computing a fourth total fuel consumption of the vehicle on the fourth route;
n. comparing the third total fuel consumption and the fourth total fuel consumption and choose one of the third route and the fourth route based on the associated third and fourth total fuel consumption;
o. changing the throttle setting to adjust the acceleration profile based on the chosen third route or fourth route.

* * * * *